US012663092B2

(12) United States Patent
Zhao et al.

(10) Patent No.: US 12,663,092 B2
(45) Date of Patent: Jun. 23, 2026

(54) VALVE BODY DEVICE, BEVERAGE MACHINE, BEVERAGE MACHINE CONTROL METHOD, AND RELATED APPARATUS

(71) Applicant: GUANGDONG MIDEA CONSUMER ELECTRIC MANUFACTURING CO., LTD., Foshan (CN)

(72) Inventors: Jinzhang Zhao, Foshan (CN); Lixin Liu, Foshan (CN); Zaisheng Guo, Foshan (CN); Zhengjun Zhou, Foshan (CN); Shaoquan Deng, Foshan (CN)

(73) Assignee: GUANGDONG MIDEA CONSUMER ELECTRIC MANUFACTURING CO., LTD., Foshan (CN)

( * ) Notice: Subject to any disclaimer, the term of this patent is extended or adjusted under 35 U.S.C. 154(b) by 48 days.

(21) Appl. No.: 18/585,681

(22) Filed: Feb. 23, 2024

(65) Prior Publication Data

US 2025/0035228 A1     Jan. 30, 2025

(30) Foreign Application Priority Data

Jul. 25, 2023    (CN) .......................... 202310916930.0

(51) Int. Cl.
*F16K 31/04* (2006.01)
*F16K 11/10* (2006.01)

(52) U.S. Cl.
CPC ............ *F16K 31/042* (2013.01); *F16K 11/10* (2013.01)

(58) Field of Classification Search
CPC ............................... F16K 31/042; F16K 11/10
See application file for complete search history.

(56) References Cited

U.S. PATENT DOCUMENTS

| | | | |
|---|---|---|---|
| 10,975,984 B2 * | 4/2021 | Uehara ................... | F16K 31/53 |
| 11,013,362 B2 | 5/2021 | Hulett et al. | |
| 11,207,945 B2 | 12/2021 | Jiang et al. | |
| 2013/0147466 A1 * | 6/2013 | Baek ....................... | F02D 9/105 |
| | | | 324/207.2 |

(Continued)

FOREIGN PATENT DOCUMENTS

| | | |
|---|---|---|
| CN | 210541010 U | 5/2020 |
| CN | 114705672 A | 7/2022 |

(Continued)

OTHER PUBLICATIONS

The European Patent Office (EPO) The Extended European Search Report for 23207325.4, Apr. 17, 2024 11 Pages.

(Continued)

*Primary Examiner* — Angelisa L. Hicks
(74) *Attorney, Agent, or Firm* — Anova Law Group, PLLC

(57)          ABSTRACT

A valve body device includes a valve body assembly including a feed flow path and a plurality of discharge flow paths, and a valve core assembly rotatably provided at the valve body assembly and having a reset position and a plurality of working positions along a rotating direction. Each working position corresponds to a discharge flow path. When the valve core assembly is at a working position, a discharge flow path corresponding to the working position communicates with the feed flow path. The valve body device further includes a drive assembly configured to drive the valve core assembly to rotate and including a position detection assembly configured to generate reset information when the valve core assembly is at the reset position, and a detection assembly configured to detect rotation information of the drive assembly and determine a rotating angle of the valve core assembly based on the rotation information.

8 Claims, 6 Drawing Sheets

(56) References Cited

U.S. PATENT DOCUMENTS

| | | | | |
|---|---|---|---|---|
| 2015/0137989 | A1* | 5/2015 | Park | G01F 3/222 |
| | | | | 340/870.02 |
| 2015/0176718 | A1 | 6/2015 | Zhuo | |
| 2015/0204457 | A1* | 7/2015 | Jordan | A61N 1/0553 |
| | | | | 340/539.1 |
| 2015/0226581 | A1* | 8/2015 | Schott | G01D 5/145 |
| | | | | 324/207.2 |
| 2019/0283534 | A1 | 9/2019 | Jiang et al. | |
| 2021/0403305 | A1 | 12/2021 | Wu et al. | |

FOREIGN PATENT DOCUMENTS

| | | | |
|---|---|---|---|
| CN | 216923310 | U | 7/2022 |
| CN | 219102180 | U | 5/2023 |
| DE | 19503618 | C1 * | 8/1996 ............ A47J 31/461 |
| DE | 102006024272 | A1 | 11/2007 |
| DE | 102019206404 | B3 | 10/2020 |
| EP | 3501349 | A1 | 6/2019 |
| EP | 3735875 | A1 | 11/2020 |
| KR | 20110021267 | A * | 3/2011 ......... F16K 37/0025 |

OTHER PUBLICATIONS

China National Intellectual Property Administration (CNIPA) Search Report for Application No. 202310916930.0 Sep. 17, 2025 6 Pages (including translation).

Korean Intellectual Property Office (KIPO) Office Action 1 for Application No. 10-2023-0152747 Aug. 7, 2025 11 Pages (including translation).

* cited by examiner

420

312

311

310

330

320

342

3411

341

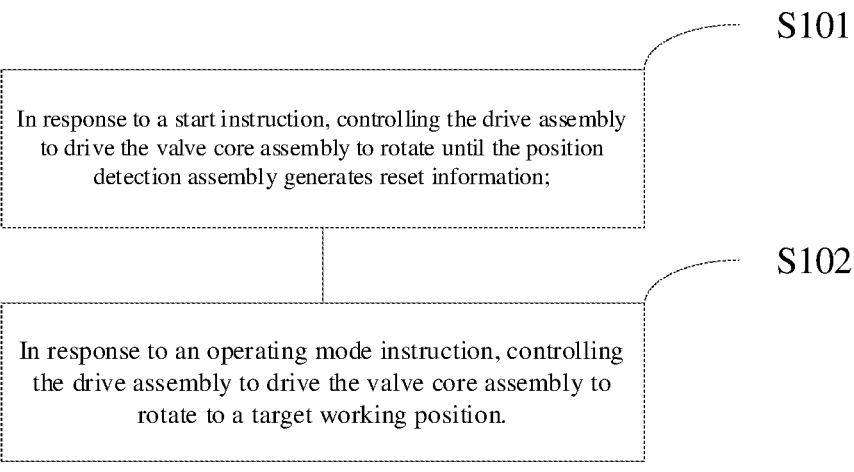

S101

In response to a start instruction, controlling the drive assembly to drive the valve core assembly to rotate until the position detection assembly generates reset information;

S102

In response to an operating mode instruction, controlling the drive assembly to drive the valve core assembly to rotate to a target working position.

Fig. 5

Computer readable storage medium 601

Computer programs 602

Fig. 6

VALVE BODY DEVICE, BEVERAGE MACHINE, BEVERAGE MACHINE CONTROL METHOD, AND RELATED APPARATUS

CROSS-REFERENCE TO RELATED APPLICATION

This disclosure claims priority to Chinese Patent Application No. 202310916930.0 filed with China National Intellectual Property Administration on Jul. 25, 2023 and entitled "VALVE BODY DEVICE, BEVERAGE MACHINE, BEVERAGE MACHINE CONTROL METHOD, AND RELATED APPARATUS," the entire contents of which are herein incorporated by reference.

FIELD

The present disclosure relates to the field of cooking equipment, and particularly relates to a valve body device, a beverage machine, a beverage machine control method, and related apparatus.

BACKGROUND

In related technologies, some beverage making devices generally adopt a multi-way valve to reduce the amount of valve components used in a flow path system in order to simplify the internal flow path system. However, when the multi-way valve is configured to conduct flow path switch or the on-off control of the flow path, it is found that sometimes there is a relatively large error between the movement amount and the required amount of the valve core of the multi-way valve, and this further results in poor reliability of the flow path control and affects the stable and smooth operation of the beverage making devices.

SUMMARY

The present disclosure aims to solve at least one of the problems that exist in related art.

Thus, the first aspect of the present disclosure provides a valve body device.

The second aspect of the present disclosure provides a beverage machine.

The third aspect of the present disclosure provides a beverage machine control method.

The fourth aspect of the present disclosure provides a computer readable storage medium.

The fifth aspect of the present disclosure provides a control device.

In view of this, the first aspect according to the embodiment of the present disclosure provides a valve body device, comprising:

a valve body assembly, formed with a feed flow path and a plurality of discharge flow paths;

a valve core assembly, rotatably provided at the valve body assembly, and the valve core assembly is formed with a reset position and a plurality of working positions along a rotating direction, each working position corresponds to one discharge flow path, and the corresponding discharge flow path communicates with the feed flow path in the case that the valve core assembly is at the working position;

a drive assembly, configured to drive the valve core assembly to rotate, and the drive assembly comprises a position detection assembly, and the position detection assembly is configured to generate reset information in the case that the valve core assembly is at the reset position; and a detection assembly, configured to detect the rotation information of the drive assembly, to determine the rotating angle of the valve core assembly according to the rotation information.

In a possible implementation, the drive assembly comprises:

a drive member;

a first transmission member, connected to the valve core assembly;

a second transmission member, connected between the drive member and the first transmission member; and the detection assembly is configured to detect the rotation information of the drive member or the rotation information of the second transmission member.

In a possible implementation, the detection assembly comprises:

a trigger member and a detection member, and either the trigger member or the detection member is provided at the drive member or the second transmission member, and the trigger member rotates with respect to the detection member, and the detection member is configured to detect to the rotation amount of the trigger member with respect to the detection member, to determine the rotation information according to the rotation amount; and the trigger member and the detection member are arranged apart from each other.

In a possible implementation, the detection assembly further comprises a support member;

either the trigger member or the detection member is provided at the output shaft of the drive member, while the other one is provided at the support member; or either the trigger member or the detection member is provided at the second transmission member, while the other one is provided at the support member.

In a possible implementation, the output shaft comprises a drive end and a free end, the drive end is connected to the second transmission member, and either the trigger member or the detection member is provided at the free end.

In a possible implementation, the number of the second transmission members is at least two, the at least two second transmission members are connected successively, and the trigger member and the detection member are respectively provided at two adjacent second transmission members.

In a possible implementation, the trigger member is a magnetic member, and the detection member is a magnetic angle sensor; or the trigger member is a capacitance electrode, and the detection member is a capacitance sensor; or the detection member is a radar.

In a possible implementation, the magnetic angle sensor is a hall sensor.

In a possible implementation, in the case that the trigger member is a magnetic member and the detection member is a magnetic angle sensor, the drive member comprises:

the output shaft, connected to the second transmission member; and a mounting plate, provided at the end of the output shaft away from the second transmission member, and the mounting plate is coaxially arranged with the output shaft, and a mounting groove is formed in the side of the mounting plate away from the output shaft;

the magnetic member is embedded in the mounting groove, and the side of the mounting plate away from the output shaft is arranged facing the magnetic angle sensor.

In a possible implementation, both the first transmission member and the second transmission member comprise gears.

In a possible implementation, the second transmission member comprises a worm shaft, a worm wheel and a first gear, the first transmission member comprises a second gear, and the worm shaft is connected to the output shaft of the drive member, and the worm shaft is arranged coaxially with the output shaft, the worm wheel is engaged with the worm shaft, the first gear is provided at the worm wheel, and the first gear is arranged coaxially with the worm wheel, and the second gear is engaged with the first gear; and the second gear is connected to the valve core assembly.

In a possible implementation, the position detection assembly comprises:

an identifier plate, provided at the first transmission member, and the identifier plate rotates synchronously with the valve core assembly in the case that the first transmission member rotates;

an identification member, and the identifier plate is provided with location identifiers, and the identification member is configured to identify the location identifiers;

the identification member is configured to generate reset information in the case that the location identifiers are identified.

In a possible implementation, the location identifiers are protrusions formed at the peripheral side of the identifier plate, and the identification member is a microswitch.

The second aspect according to the embodiment of the present disclosure provides a beverage machine, comprising:

any of the valve body devices provided in the above first aspect.

In a possible implementation, the beverage machine further comprises:

a brewing device, and at least one of a plurality of discharge flow paths is communicated to the brewing device;

a liquid outlet device, and at least one of the plurality of discharge flow paths is communicated to the liquid outlet device; and a foaming device, and at least one of the plurality of discharge flow paths is communicated to the foaming device.

The third aspect according to the embodiment of the present disclosure provides a beverage machine control method configured to control any of the beverage machines provided in the above second aspect, and the control method comprises:

in response to a start instruction, controlling the drive assembly to drive the valve core assembly to rotate until the position detection assembly generates reset information; and in response to an operating mode instruction, controlling the drive assembly to drive the valve core assembly to rotate to a target working position;

the target working position is one of a plurality of working positions.

In a possible implementation, the step of controlling the drive assembly to drive the valve core assembly to rotate to a target working position in response to an operating mode instruction comprises:

determining the target working position according to the operating mode instruction;

controlling the drive assembly to operate to drive the valve core assembly to rotate;

controlling the detection assembly to operate to determine the rotating angle of the valve core assembly; and controlling the drive assembly to stop in the case that the rotating angle reaches a target rotating angle;

the target rotating angle is equal to the included angle between a reset position and the target working position along a rotating direction.

The fourth aspect according to the embodiments of the present disclosure provides a computer readable storage medium, and the computer readable storage medium stores computer programs to achieve any of the control methods provided in the above third aspect.

The fifth aspect according to the embodiments of the present disclosure provides a control device, comprising:

a memory, stored with the computer programs; and a processor, executing the computer programs;

any of the control methods provided in the above third aspect is achieved when the processor executes the computer programs.

Compared with the related art, the present disclosure at least comprises the following beneficial effects: the valve body device proposed by the embodiments of the present disclosure comprises the valve body assembly, the valve core assembly, the drive assembly and the detection assembly, and the valve body assembly is formed with the feed flow path and the discharge flow paths, and the materials inside the flow path system can flow through the valve body device through the feed flow path and the discharge flow paths; there are multiple discharge flow paths, and through the manner of driving the valve core assembly to rotate with respect to the valve body assembly, the drive assembly can make the valve core assembly switch between different working positions, and thus the on-off states of the above plurality of flow paths can be changed, and furthermore, in practical applications, the valve body device can assign the received materials to different external apparatuses, to achieve a multi-path integrated control, which helps reduce the amount of the valve members of the device using the valve body device and simplify the flow path system of the device; the drive assembly comprises the position detection assembly, the valve core assembly further comprises the reset position, the position detection assembly is configured to generate the reset information in the case that the valve core assembly is located at the reset position, and this helps get the position state of the valve core assembly during the use of the valve body device; the detection assembly is configured to detect the rotation information of the drive assembly and determine the rotating angle of the valve core assembly according to the rotation information, and thereby, based on the arrangement, in the process of using the drive assembly to drive the valve core assembly to rotate from the current position to the target working position, the reset position can be taken as a standard, i.e., the valve core assembly can be made to rotate from the current position to the reset position and rotate from the reset position to the target working position, and based on the angle interval between the target working position and the reset position, the need on the angle for rotating the valve core assembly from the reset position to the target working position is determined, and then the actual rotating angle of the valve body device starting from the reset position is detected through the detection assembly, in the case that the rotating angle detected by the detection assembly meets the need on the rotating angle, it can be ensured that the valve core assembly rotates to the target working position, and this prevents the lowering of the accuracy of the control over the rotating of the valve core assembly caused by error accumulation, provides a guarantee for the valve body device to stably and accurately conduct flow path control and ensures the stable and smooth operation of the beverage making device in the case that the valve body device is applied to the beverage making device.

BRIEF DESCRIPTION OF THE DRAWINGS

Various other advantages and benefits will be obvious for a person skilled in the art by reading the following specific description of the exemplary implementations. The accompanying drawings are only used for the purpose of showing the exemplary implementations and are not construed as a limitation to the present disclosure. In addition, in the entire drawings, the same reference signs are configured to indicate the same components. In the accompanying drawings.

FIG. 5 shows a schematic flow chart of a beverage machine control method according to an embodiment of the present disclosure;

FIG. 6 shows a schematic block diagram of the structure of a computer readable storage medium according to an embodiment of the present disclosure.

Figure 1:
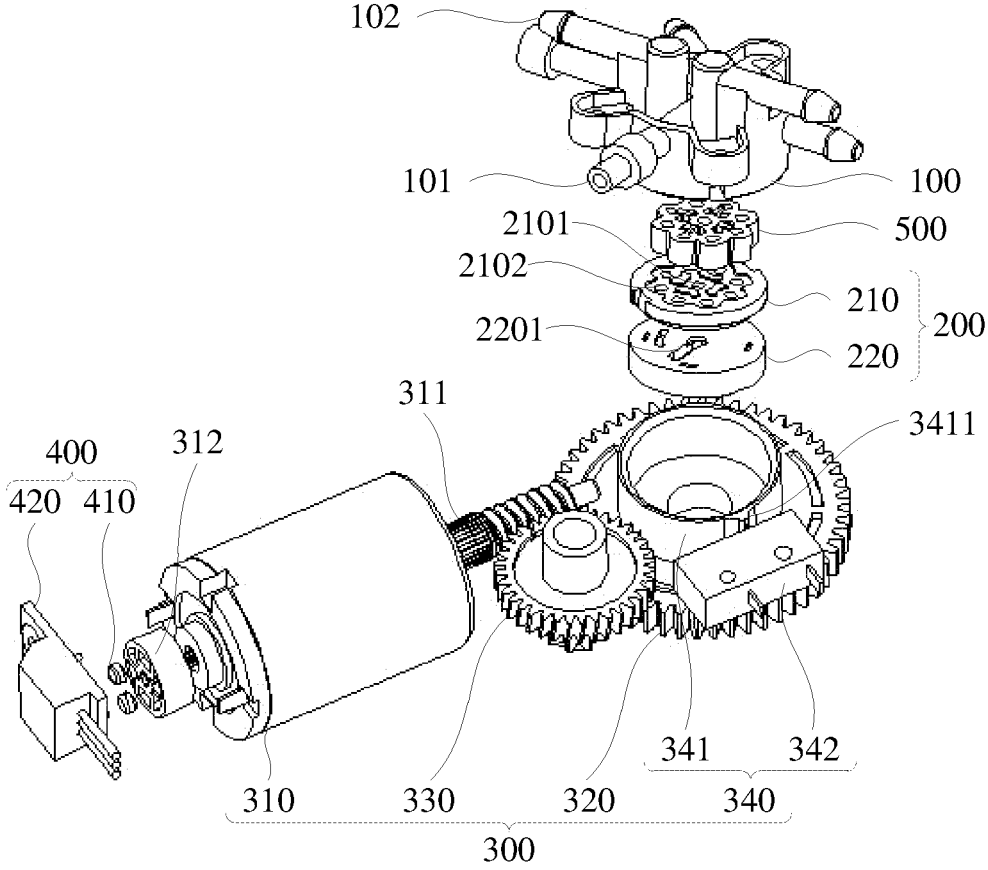
FIG. 1 shows a schematic exploded structural diagram of a valve body device according to an embodiment of the present disclosure.
Figure 2:
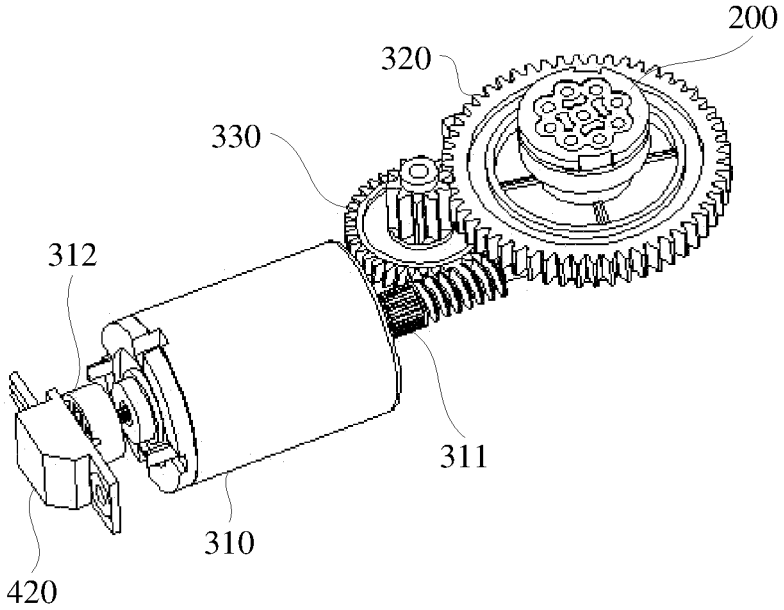
FIG. 2 shows a schematic structural diagram of a valve body device from a first view angle according to an embodiment of the present disclosure.
Figure 3:
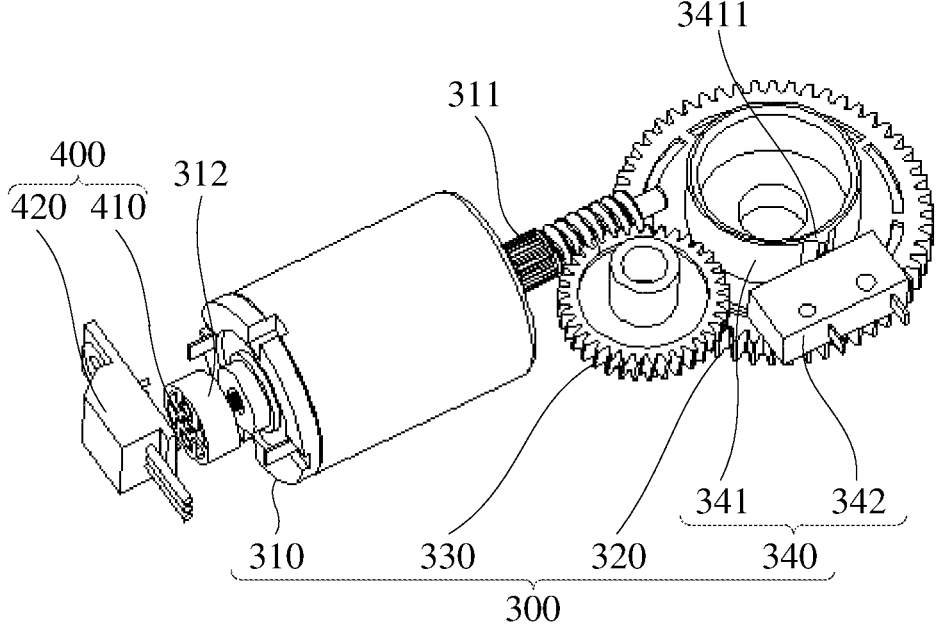
FIG. 3 shows a schematic structural diagram of the valve body device from a second view angle according to an embodiment of the present disclosure.
Figure 4:
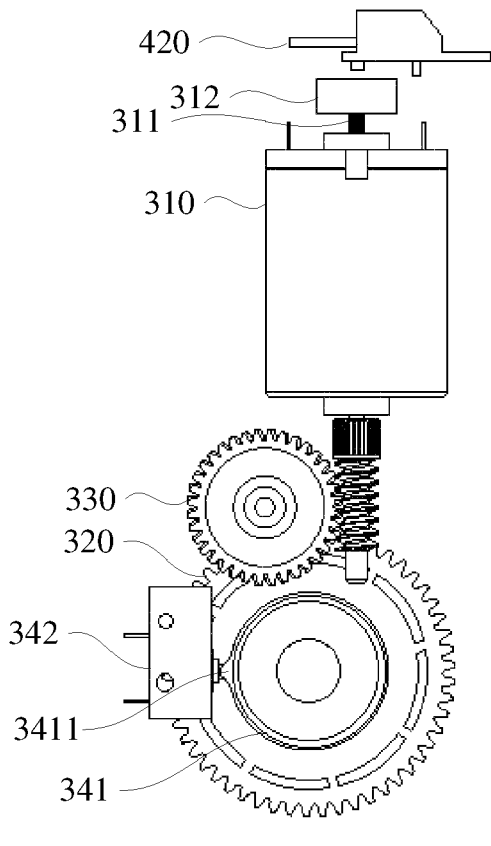
FIG. 4 shows a schematic structural diagram of the valve body device from a third view angle according to an embodiment of the present disclosure.

The corresponding relationships between the reference signs and the component names in FIG. 1 to FIG. 4 are as follows:

100: valve body assembly, 200: valve core assembly, 300: drive assembly, 400: detection assembly, 500: sealing member portion,
210: first valve core, 220: second valve core,
310: drive member, 320: first transmission member, 330: second transmission member, 340: position detection assembly,
410: trigger member, 420: detection member,
311: output shaft, 312: mounting plate, 341: identifier plate, 342: identification member,
3411: location identifier,
101: feed flow path, 102: discharge flow path,
2101: feed inlet, 2102: discharge port, and 2201: feed trough.

DETAILED DESCRIPTION OF THE DISCLOSURE

The exemplary embodiments of the present disclosure will be described in more details by referring to the accompanying drawings. Although the accompanying drawings show the exemplary embodiments of the present disclosure, it should be understood that the present disclosure can be achieved through various methods and should not be limited by the embodiments stated herein. On the contrary, the embodiments provided herein are intended to provide a thorough understanding to the present disclosure, and can deliver the protection scope of the present disclosure completely to one skilled in the art.

As shown in FIG. 1 to FIG. 4, the first aspect according to the embodiments of the present disclosure provides a valve body device, comprising: a valve body assembly 100, formed with a feed flow path 101 and a plurality of discharge flow paths 102; a valve core assembly 200, rotatably provided at the valve body assembly 100, and the valve core assembly 200 is formed with a reset position and a plurality of working positions along a rotating direction, each working position corresponds to one discharge flow path 102, and the corresponding discharge flow path 102 communicates with the feed flow path 101 in the case that the valve core assembly 200 is at the working position; a drive assembly 300, configured to drive the valve core assembly 200 to rotate, and the drive assembly 300 comprises a position detection assembly 340, and the position detection assembly 340 is configured to generate reset information in the case that the valve core assembly 200 is at the reset position; and a detection assembly 400, configured to detect the rotation information of the drive assembly 300, to determine the rotating angle of the valve core assembly 200 according to the rotation information.

The valve body device provided by the embodiments of the present disclosure comprises the valve body assembly 100, the valve core assembly 200, the drive assembly 300 and the detection assembly 400, and the valve body assembly 100 is formed with the feed flow path 101 and the discharge flow paths 102, and the materials inside the flow path system can flow through the valve body device through the feed flow path 101 and the discharge flow paths 102; there are multiple discharge flow paths 102, and through the manner of driving the valve core assembly 200 to rotate with respect to the valve body assembly 100, the drive assembly 300 can make the valve core assembly 200 switch between different working positions, and thus the on-off states of the above plurality of flow paths can be changed, and furthermore, in practical applications, the valve body device can assign the received materials to different external apparatuses, to achieve a multi-path integrated control, which helps reduce the amount of the valve members of the device using the valve body device and simplify the flow path system of the device.

The drive assembly 300 comprises the position detection assembly 340, the valve core assembly 200 further comprises the reset position, the position detection assembly 340 is configured to generate the reset information in the case that the valve core assembly 200 is located at the reset position, and thus this helps get the position state of the valve core assembly 200 during the use of the valve body device, and the position of the valve core assembly 200 is corrected through the position detection assembly 340, and then the position error accumulation of the valve core assembly 200 can be reduced in the use process; the detection assembly 400 is configured to detect the rotation information of the drive assembly 300 and determine the rotating angle of the valve core assembly 200 according to the rotation information, and this helps improve the accuracy of the control over the rotating of the valve core assembly 200, and provide a guarantee for the valve body device to stably and accurately conduct flow path control.

It can be understood that the rotation information can comprise, but is not limited to, the output rotating speed, the output torque, rotating angle and the like of the drive assembly 300; the valve core assembly 200 easily contacts the materials in use, and thus, in practical applications, the valve core assembly 200 can be provided inside the valve body assembly 100 and is located in a relatively closed environment, to prevent the leakage or contamination of the materials, and the rotating angle of the valve core assembly 200 is determined according to the rotation information, direct rotating detection on the valve core assembly 200 can be prevented, and this helps improve the convenience for detecting the rotating angle of the valve core assembly 200, and helps improve the stability of the rotating of the valve core assembly 200.

Exemplarily, in the process of using the drive assembly 300 to drive the valve core assembly 200 to rotate from the current position to the target working position, the reset position can be taken as a standard to conduct the control over the rotating of the valve core assembly 200, i.e., in the process of using the drive assembly 300 to drive the valve core assembly 200 to rotate from the current position to the target working position, the valve core assembly 200 can be made to rotate from the current position to the reset position and rotate from the reset position to the target working position, and in the case that the target working position is known, based on the angle interval between the target working position and the reset position, the need on the angle for rotating the valve core assembly 200 from the reset position to the target working position is determined, and then the actual rotating angle of the valve body device starting from the reset position is detected through the detection assembly 400, in the case that the rotating angle detected by the detection assembly 400 meets the need on the rotating angle, it can be ensured that the valve core assembly 200 rotates to the target working position, and this prevents the lowering of the accuracy of the control over the rotating of the valve core assembly 200 caused by error accumulation, provides a guarantee for the valve body device to stably and accurately conduct flow path control and ensures the stable and smooth operation of the beverage making device in the case that the valve body device is applied to the beverage making device.

It can be understood that in some embodiments, when the valve core of a multi-way valve conducts position switching, there is usually a certain error between the actual rotating angle executed by the valve core and a required value, and with the increasing of the number of times of the position switching, the error will further accumulate and increase, which further results in the lowering of the accuracy of the control over the rotating of the valve core, and the reliability of the control over the flow path by the multi-way valve is lowered. Based on the arrangement, the valve body device provided by the embodiments of the present disclosure can 20 determine the position of the valve core assembly 200 via the position detection assembly 340 in the process of using the drive assembly 300 to drive the valve core assembly 200 to rotate from the current position to the target working position, and this further helps correct the position of the valve core assembly 200 and meanwhile helps achieve the accurate control over the rotating of the valve core assembly 200 through detecting the actual rotating angle of the valve core assembly 200 by the detection assembly 400, and provides a guarantee for the valve body device to stably and accurately conduct flow path control.

It can be understood that the valve body device provided by the embodiments of the present disclosure is applied to apparatus with a flow path system, such as fluid machinery and hydraulic machinery, or can be applied to a beverage making device, such as a coffee machine, a tea machine, a milk-tea machine and a bubble water machine, and thus helps simplify the flow path system of the corresponding apparatus or device, and ensures the accuracy and reliability of the flow path control while the amount of the valve components used in the corresponding apparatus or device is reduced.

As shown in FIG. 1, exemplarily, the valve core assembly 200 can comprise a first valve core 210 and a second valve core 220, and the first valve core 210 can be formed with a feed inlet 2101 and a plurality of discharge ports 2102, the feed inlet 2101 is communicated to the feed flow path 101, the discharge ports 2102 are communicated to the second valve core 220 in a one-to-one correspondence manner, and the second valve core 220 are rotatably provided at the first valve core 210, and are formed with feed troughs 2201, the feed inlet 2101 is communicated to the feed troughs 2201, the second valve core 220 comprises the multiple working positions, each working position corresponds to one of the discharge ports 2102, and in the case that the second valve core 220 is located at the working positions, the feed inlet 2101 can be conducted to the corresponding discharge port 2102 through the feed troughs 2201, and thus, the corresponding discharge flow path 102 is conducted.

It can be understood that in the case that the valve core assembly 200 is not located at the working positions, the feed inlet 2101 and the discharge ports 2102 are in a cut-off state, and correspondingly, each discharge flow path 102 is further in the cut-off state.

It can be understood that in the case that the valve core assembly 200 comprises the first valve core 210 and the second valve core 220, the drive assembly 300 is configured to drive the second valve core 220 to rotate with respect to the first valve core 210, i.e., the second valve core 220 can be connected to the drive assembly 300, to rotate with respect to the first valve core 210 under the driving of the drive assembly 300.

It can be understood that the drive assembly 300 can comprise a drive member 310 for outputting rotation, the drive member 310 can be, but is not limited to, an electrical machine, a motor, etc., in an embodiment, it can be a stepper motor, a servo motor, etc.; the drive member 310 can be directly connected to the valve core assembly 200, to save the energy consumption for driving, can further be connected to the valve core assembly 200 through a transmission mechanism, to improve the stability and reliability of the valve core assembly 200 during rotating through the transmission mechanism, and ensure a relatively stable transmission ratio between the valve core assembly 200 and the drive member 310, to further improve the accuracy of the control over the rotation of the valve core assembly 200.

As shown in FIG. 1 to FIG. 4, in a possible implementation, the drive assembly 300 comprises: a drive member 310; a first transmission member 320, connected to the valve core assembly 200; a second transmission member 330, connected between the drive member 310 and the first transmission member 320; and the detection assembly 400 is configured to detect the rotation information of the drive member 310 or the rotation information of the second transmission member 330.

In the embodiment, the drive assembly 300 can comprise the drive member 310, the first transmission member 320 and the second transmission member 330, and the first transmission member 320 is connected to the valve core assembly 200, the second transmission member 330 is connected between the first transmission member 320 and the drive member 310, and the drive member 310 is configured to provide power; in the case that the drive member 310 operates, the drive member 310 can drive the second transmission member 330 and the first transmission member 320 to move sequentially, and the valve core assembly 200 is driven to rotate through the second transmission member 330, to achieve the position switching of the valve core assembly 200, and this helps improve the controllability of the operation of the valve body device; in addition, the first transmission member 320 and the second transmission member 330 can transform the rotating speed and the torque output by the drive member 310 and apply them to the valve core assembly 200, which helps ensure the stability of the rotating of the valve core assembly 200; and based on the above arrangement, the drive assembly 300 can limit the transmission ratio between the drive member 310 and the valve core assembly 200 through the first transmission member 320 and the second transmission member 330, which helps achieve the control over a small angle rotation of the vale core portion 200 and improve the accuracy of the control over the rotating of the valve core assembly 200.

Meanwhile, the detection assembly 400 is configured to detect the rotation information of the drive member 310 or the rotation information of the second transmission member 330, to determine the rotating angle of the valve core assembly 200 according to the rotation information of the drive member 310 or the rotation information of the second transmission member 330; based on the above arrangement, on the one hand, in the case that the output rotating speed of the drive member 310 and the transmission ratio between the drive member 310 and the valve core assembly 200 are known, the rotating angle of the valve core assembly 200 can be driven through the rotation information of the drive member 310 or the rotation information of the second transmission member 330, and this prevents directly using the detection member 420 to detect, and enhances the convenience in detecting the rotating angle of the valve core assembly 200 and helps improve the stability of the rotation of the valve core assembly 200; on the other hand, since the first transmission member 320 is connected to the valve core assembly 200, the rotating state of the first transmission member 320 is similar to the rotating state of the valve core assembly 200, and correspondingly, based on the transmitting function of the first transmission member 320 and the second transmission member 330, both the output rotating speed of the drive member 310 and the rotating speed of the second transmission member 330 will be higher than the rotating speed of the valve core assembly 200, and then, in the case that the detecting accuracy of the detection assembly 400 is fixed, the rotating angle of the valve core assembly 200 is determined through the rotation information of the drive member 310 or the rotation information of the second transmission member 330, which can greatly reduce the result error in determining the rotating angle of the valve core assembly 200, and helps further improve the accuracy of the control over the rotating of the valve core assembly 200, and provides a further guarantee for the stable and reliable operation of the valve body device.

Exemplarily, considering the stability when the drive assembly 300 drives the valve core assembly 200 to rotate, the transmission from the drive member 310 to the valve core assembly 200 can be a decelerating transmission, i.e., the rotating speed of the valve core assembly 200 is lower than the rotating speed of the drive member 310, and the rotating speeds of the drive member 310, the second transmission member 330 and the first transmission member 320 decrease sequentially; the detection assembly 400 can be configured to detect the rotating angle of a rotating member, in an embodiment, the detecting error of the detection assembly 400 is ±1° and the transmission ratio between the drive member 310 and the valve core assembly 200 is 10:1, if the drive member 310 actually rotates 720°, the theoretical rotating angle of the valve core assembly 200 should be 72°, and considering that the detection assembly 400 generates a detecting error of 1° under the effect of the detecting accuracy, a detecting result of 71° or 73° can be obtained by directly detecting the rotating angle of the valve core assembly 200 by the detection assembly 400, and correspondingly, the rotating angle of the drive member 310 is detected and a detecting result of 719° or 721° can be obtained, and thus, the measurement value of the rotating angle of the valve core assembly 200 is calculated according to the rotation information of the drive member 310 detected by the detection assembly 400 and in combination with the transmission ratio between the drive member 310 and the valve core assembly 200, the detecting result of 71.9° or 72.1° can be obtained; it is not difficult to understand that based on the detecting method provided by the embodiment, the error of the detecting result of the rotating angle of the valve core assembly 200 can be largely reduced, the detecting accuracy of the rotating angle of the valve core assembly 200 is improved, and a further guarantee is provided for the stable and reliable operation of the valve body device.

Based on the same reasons, it can be understood that the detecting error can further be reduced through determining the rotating angle of the valve core assembly 200 based on the rotation information of the second transmission member 330.

It can be understood that the transmission between the drive member 310 and the valve core assembly 200 can be conducted by a relatively stable transmission ratio, for example, gear transmission, chain transmission, belt transmission, etc., and correspondingly, the first transmission member 320 and the second transmission member 330 can respectively be different gears engaged with each other, different belt wheels connected by transmission belts or different chain wheels connected by chains, etc.

It can be understood that the number of the second transmission member 330 can be more than or equal to one; in the case that the number of the second transmission member 330 is more than one, the second transmission members 330 are connected successively, and at least one second transmission member 330 is connected to the drive member 310, at least one second transmission member 330 is connected to the first transmission member 320, and thereby this helps further increase the transmission ratio between the drive member 310 and the valve core assembly 200, and further improves the stability of the rotating of the valve core assembly 200 and the accuracy of the control over the rotating of the valve core assembly 200.

As shown in FIG. 1 to FIG. 4, in a possible implementation, the detection assembly 400 comprises: a trigger member 410 and a detection member 420, and either the trigger member 410 or the detection member 420 is provided at the drive member 310 or the second transmission member 330, and the trigger member 410 rotates with respect to the detection member 420, and the detection member 420 is configured to detect to the rotation amount of the trigger member 410 with respect to the detection member 420, to determine the rotation information according to the rotation amount; and the trigger member 410 and the detection member 420 are arranged apart from each other.

In the embodiment, the detection assembly 400 can comprise the trigger member 410 and the detection member 420, and either the trigger member 410 or the detection member 420 can be disposed on the drive member 310 or the second transmission member 330, and the trigger member 410 rotates with respect to the detection member 420, and it can be understood that one of the trigger member 410 and the detection member 420 which is disposed on the drive member 310 or the second transmission member 330 can rotate synchronously with the drive member 310 or the second transmission member 330, and thus, the detection member 420 can determine the rotation information of the drive member 310 or the first transmission member 320 through detecting the rotation amount of the trigger member 410 with respect to the detection member 420, and further-more, the rotating angle of the valve core assembly 200 is determined, to provide a reliable reference for the control over the rotating of the valve core assembly 200; in addition, the arrangement position of the detection assembly 400 is relatively flexible, which helps further ensure the detecting accuracy of the detection assembly 400, and helps provide a more reliable guarantee for the stable and smooth opera-tion of the valve body device.

Meanwhile, the trigger member 410 and the detection member 420 are arranged apart from each other, and the trigger member 410 is prevented from directly contacting the detection member 420 in the detecting process, and correspondingly, the trigger member 410 can trigger the detection member 420 in a non-contact manner, and this helps lower the possibility of the damage and the failure of the structure of the detection assembly 400, improves the detecting accuracy of the detection assembly 400 and extends the service life of the detection assembly 400.

Exemplarily, the trigger member 410 can be disposed on the drive member 310 or the second transmission member 330, or, the detection member 420 can be disposed on the drive member 310 or the second transmission member 330.

It can be understood that in the case that the trigger member 410 is disposed on the drive member 310 or the second transmission member 330, the arrangement position of the detection member 420 can be disposed in combination with the position of the trigger member 410, as long as the relative rotating and triggering between the detection mem-ber 420 and the trigger member 410 are ensured. Corre-spondingly, in the case that the detection member 420 is disposed on the drive member 310 or the second transmis-sion member 330, the arrangement position of the trigger member 410 is based on the same reasons, as long as the relative rotating and triggering between the detection mem-ber 420 and the trigger member 410 are ensured.

It can be understood that the rotation amount of the trigger member 410 with respect to the detection member 420 can comprise, but is not limited to, the rotating speed, the rotating angle, the number of rotating laps and the like of the trigger member 410 with respect to the detection member 420.

In a possible implementation, the detection assembly 400 further comprises a support member; either the trigger member 410 or the detection member 420 is provided at the output shaft 311 of the drive member 310, while the other one is provided at the support member; or either the trigger member 410 or the detection member 420 is provided at the second transmission member 330, while the other one is provided at the support member.

In the embodiment, the detection assembly 400 can fur-ther comprise the support member, one of the trigger mem-ber 410 and the above said detection member 420 can be disposed on the output shaft 311 of the drive member 310, the other one can be disposed on the support member, in an embodiment, the trigger member 410 can be disposed on the output shaft 311 of the drive member 310, and correspond-ingly, the detection member 420 can be disposed on the support member, or the detection member 420 can be disposed on the output shaft 311 of the drive member 310, and correspondingly the trigger member 410 can be dis-posed on the support member, and thus, when either the trigger member 410 or the detection member 420 rotates with the output shaft 311 of the drive member 310, the trigger member 410 and the detection member 420 can form relative rotation therebetween, and through obtaining the rotation amount of the trigger member 410 with respect to the detection member 420 by the detection member 420, the rotation information of the drive member 310 can be obtained, and this provides a basis for determining the rotating angle of the valve core assembly 200, meanwhile, the detection assembly 400 can further use the support member to provide a stable support for the trigger member 410 or the detection member 420, and this ensures the stable and smooth execution in the detecting process, and helps improve the detecting accuracy of the detection assembly 400.

Or, either the trigger member 410 or the detection member 420 can be disposed on the second transmission member 330, the other one can be disposed on the support member, in an embodiment, the trigger member 410 can be disposed on the second transmission member 330, and correspond-ingly, the detection member 420 can be disposed on the support member, or the detection member 420 can be disposed on the second transmission member 330, and correspondingly the trigger member 410 can be disposed on the support member, and thus, when either the trigger member 410 or the detection member 420 rotates with the second transmission member 330, the trigger member 410 and the detection member 420 can form relative rotation therebetween, and through obtaining the rotation amount of the trigger member 410 with respect to the detection mem-ber 420 by the detection member 420, the rotation informa-tion of the second transmission member 330 can be obtained, and this provides a basis for determining the rotating angle of the valve core assembly 200, meanwhile, the detection assembly 400 can further use the support member to provide a stable support for the trigger member 410 or the detection member 420, and this ensures the stable and smooth execution in the detecting process, and helps improve the detecting accuracy of the detection assembly 400.

It can be understood that the support member can be disposed on a fixing portion of the apparatus using the valve body device in practical applications, as long as the relative rotation and triggering between the detection member 420 and the trigger member 410 are ensured, in an embodiment, it may be the housing, the frame and the like of the apparatus, and is not limited herein.

As shown in FIG. 1 to FIG. 4, in a possible implemen-tation, the output shaft 311 comprises a drive end and a free end, the drive end is connected to the second transmission member 330, and either the trigger member 410 or the detection member 420 is provided at the free end.

In the embodiment, the output shaft 311 of the drive member 310 can comprise the drive end and the free end; it can be understood that the drive end and the free end can be two opposite shaft ends of the output shaft 311, and corre-spondingly, the drive end can be connected to the second transmission member 330, to transmit the power to the second drive member 310 when the drive member 310 operates, and further drive the first drive member 310 and the valve core assembly 200 to rotate; either the trigger member 410 or the detection member 420 can be disposed on the free end, and thus the trigger member 410 or the detection member 420 is relatively far away from the transmission portion of the drive assembly 300, to prevent the detection member 420 or the trigger member 410 from interfering the operation of the drive assembly 300, and this helps improve the stability of the operation of the detection assembly 400 and the drive assembly 300, and improves the accuracy of the control over the rotating of the valve core assembly 200.

In a possible implementation, the number of the second transmission members 330 is at least two, the at least two second transmission members 330 are connected successively, and the trigger member 410 and the detection member 420 are respectively provided at two adjacent second transmission members 330.

In the embodiment, the trigger member 410 and the detection member 420 can be respectively disposed on two adjacent second transmission members 330; it can be understood that the transmission ratio between two adjacent members on the transmission chain of the drive assembly 300 is fixed, and thus, based on the arrangement, according to the transmission ratio of two adjacent second transmission members 330 and the rotation amount of the trigger member 410 with respect to the detection member 420 detected by the detection member 420, the rotation information of the second transmission member 330 where the trigger member 410 locates can be determined, and furthermore the rotating angle of the valve core assembly 200 is determined, and based on the above arrangement method, the distribution area of the detection assembly 400 and the drive assembly 300 can be more concentrated, thereby helping further improve the compactness of structure of the valve body device and improve the miniaturization level of the valve body device.

In a possible implementation, the trigger member 410 is a magnetic member, and the detection member 420 is a magnetic angle sensor; or the trigger member 410 is a capacitance electrode, and the detection member 420 is a capacitance sensor; or the detection member 420 is a radar.

In the embodiment, the trigger member 410 can be a magnetic member, and the detection member 420 can be a magnetic angle sensor, and thus, in the case that the trigger member 410 rotates with respect to the detection member 420, the detection member 420 can determine the rotation mount of the trigger member 410 with respect to the detection member 420 through detecting the change information of the magnetic angle, to provide reference for determining the rotating angle of the valve core assembly 200, and based on the method of magnetic angle detection, the trigger member 410 does not need to contact the detection member 420, this helps keep a distance between the trigger member 410 and the detection member 420, and further reduce the contact between the trigger member 410 and the detection member 420, improve the detecting accuracy and service life of the detection assembly 400, and helps further ensure the accuracy of the detecting result of the rotating angle of the valve core assembly 200 as the magnetic angle detection has a relatively low sensitivity to environment parameters.

It can be understood that in the case that the valve body device is applied to a beverage making device, dusts and mists may exist in the environment where the valve body device locates, in some embodiments, a photoswitch is configured to conduct the detecting of the rotation amount, but the photoswitch is affected greatly by the environment factor, and the phenomenon of signal distortion easily occurs under the effect of voltage fluctuation, while the magnetic angle detection has a relatively low sensitivity to the environment effect, this helps execute a relatively accurate detecting operation in the environment, and the effect of the voltage fluctuation to the detecting accuracy is relatively low.

In the embodiment, the trigger member 410 can further be a capacitance electrode, the detection member 420 correspondingly can be a capacitance sensor, and thus, in the case that the trigger member 410 rotates with respect to the detection member 420, the trigger member 410 can further trigger the detection member 420 through a non-contact method, to help the detection member 420 detect the rotation amount of the trigger member 410 with respect to the detection member 420, and further reduce the contact between the trigger member 410 and the detection member 420, improve the detecting accuracy and the service life of the detection assembly 400, and help further ensure the accuracy of the detecting result of the rotating angle of the valve core assembly 200 as the capacitance detection has a relatively low sensitivity to the environment parameters.

In the embodiment, the detection member 420 can be a radar; in the case that the detection member 420 is a radar, it has a relatively low requirement for the type of the trigger member 410, the trigger member 410 may be a reference or a reference structure which can be identified by the radar, in an embodiment, it may be a convex or concave structure, etc., and thus, based on the arrangement, in the case that the trigger member 410 rotates with respect to the detection member 420, the trigger member 410 can further trigger the detection member 420 through a non-contact method, to help the detection member 420 detect the rotation amount of the trigger member 410 with respect to the detection member 420, and further reduce the contact between the trigger member 410 and the detection member 420, improve the detecting accuracy and the service life of the detection assembly 400, and help further ensure the accuracy of the detecting result of the rotating angle of the valve core assembly 200 as the radar which can detect the rotation amount through radio waves has a relatively low sensitivity to the environment parameters.

In a possible implementation, the magnetic angle sensor is a hall sensor.

In the embodiment, in the case that the detection member 420 is a magnetic angle sensor and the trigger member 410 is a magnetic member, the magnetic angle sensor can adopt the hall sensor, the hall sensor has a smaller volume and a lower weight, and this helps further improve the lightweight and miniaturizing level of the valve body device, and in addition, the hall sensor has a relatively high mounting convenience and low power consumption during the operation, and thus can help further reduce the costs in the production and use of the valve body device; meanwhile, the hall sensor has good motion detecting performance, has a relatively low requirement for the use environment, and thus helps ensure the accuracy of the detecting of the rotating angle of the valve core assembly 200.

As shown in FIG. 1 to FIG. 4, in a possible implementation, in the case that the trigger member 410 is a magnetic member and the detection member 420 is a magnetic angle sensor, the drive member 310 comprises: the output shaft 311, connected to the second transmission member 330; and a mounting plate 312, provided at the end of the output shaft 311 away from the second transmission member 320, and the mounting plate 312 is coaxially arranged with the output shaft 311, and a mounting groove is formed in the side of the mounting plate 312 away from the output shaft 311; and the magnetic member is embedded in the mounting groove, and the side of the mounting plate 312 away from the output shaft 311 is arranged facing the magnetic angle sensor.

In the embodiment, in the case that the detection member 420 is the magnetic angle sensor and the trigger member 410 is the magnetic member, the drive member 310 can comprise the output shaft 311 and the mounting plate 312, and the output shaft 311 is configured to conduct power output, i.e., one end of the output shaft 311 can be connected to the second transmission member 330, the mounting plate 312 is disposed at the end of the output shaft 311 away from the second transmission member 330, i.e., the mounting plate 312 can be disposed at the free end of the output shaft 311, and thus, in the case that the output shaft 311 rotates, the mounting plate 312 can rotate synchronously with the output shaft 311, a mounting groove can be formed in the side of the mounting plate 312 away from the output shaft 311, and correspondingly, the magnetic member can be disposed in the mounting groove, and thus the magnetic member can rotate synchronously with the mounting plate 312; the magnetic angle sensor can be disposed facing the side of the mounting plate 312 away from the output shaft 311, to help the magnetic member trigger the magnetic angle sensor, help the magnetic angle sensor detect the rotation amount of the mounting plate 312, and provide a reference for determining the rotating angle of the valve core assembly 200. Meanwhile, based on the above arrangement, the trigger member 410 and the detection member 420 can further be relatively far away from the transmission portion of the drive assembly 300, to prevent the detection member 420 or the trigger member 410 from interfering the operation of the drive assembly 300, help improve the stability of the operation of the detection assembly 400 and the drive assembly 300, and improve the accuracy of the control over the rotating of the valve core assembly 200.

As shown in FIG. 1 to FIG. 4, in a possible implementation, both the first transmission member 320 and the second transmission member 330 comprise gears.

In the embodiment, both the first transmission member 320 and the second transmission member 330 can comprise gears, i.e., the delivery of rotating speed and torque can be conducted between the drive member 310 and the valve core assembly 200 in a gear transmission method, and thus, on the one hand, the gear transmission has a relatively high rotating stability, and this helps conduct the delivery of the motion amount in a rotating manner, further helps improve the stability of the rotating speed of the valve core assembly 200, and ensures the stable and smooth rotating of the valve core assembly 200; on the other hand, the transmission ratio of the gear transmission is fixed, this helps determine the rotating angle of the valve core assembly 200 according to the rotation information of the drive member 310 or the second transmission member 330, and helps conduct an accurate control over the rotation parameter of the valve core assembly 200 and provides a further guarantee to the stable and reliable operation of the valve body device.

It can be understood that the specific forms of the gears can be, but are not limited to, spur gears, bevel gears, helical gears, worm wheels, worm shafts, etc., the specific forms of the gears can be disposed in combination with actual needs, and are not limited herein.

As shown in FIG. 1 to FIG. 4, in a possible implementation, the second transmission member 330 comprises a worm shaft, a worm wheel and a first gear, the first transmission member 320 comprises a second gear, and the worm shaft is connected to the output shaft 311 of the drive member 310, and the worm shaft is arranged coaxially with the output shaft 311, the worm wheel is engaged with the worm shaft, the first gear is provided at the worm wheel, and the first gear is arranged coaxially with the worm wheel, and the second gear is engaged with the first gear; and the second gear is connected to the valve core assembly 200.

In the embodiment, there can be multiple second transmission members 330, the multiple second transmission members 330 can comprise the worm shaft, the worm wheel and the first gear, and the worm shaft can be coaxially connected to the output shaft 311 of the drive member 310, and thus, in the case that the above said output shaft 311 rotates, the worm shaft can rotate synchronously, the worm wheel is engaged with the worm shaft, and thus, the motion outputted by the output shaft 311 can be transformed preferentially in a manner of transmission through the worm wheel and the worm shaft, this helps reduce the rotating speed and improve the torque, and further provides a reliable dynamic foundation for the driving of the valve core assembly 200; the first gear can be coaxially disposed with the worm wheel, and thus can rotate synchronously with the worm wheel, and the first transmission member 320 can comprise the second gear, the second gear is engaged with the first gear, and the second gear is connected to the valve core assembly 200, and thus, the motion outputted by the drive member 310 can be further transformed through the first gear and the second gear, and acts on the valve core assembly 200 through the second gear wheel, and this helps further increase the transmission ratio between the drive member 310 and the valve core assembly 200, helps the valve core assembly 200 conduct small angle rotation, improve the accuracy of the control over the rotating of the valve core assembly 200, and increase the stability of the rotating of the valve core assembly 200.

It can be understood that the specific forms of the first gear and the second gear can be, but are not limited to, spur gears, bevel gears, helical gears, etc., the specific forms of the first gear and the second gear can be disposed in combination with actual needs, and are not limited herein.

As shown in FIG. 1 to FIG. 4, in a possible implementation, the position detection assembly 340 comprises: an identifier plate 341, provided at the first transmission member 320, and the identifier plate 341 rotates synchronously with the valve core assembly 200 in the case that the first transmission member 320 rotates; an identification member 342, and the identifier plate 341 is provided with location identifiers 3411, and the identification member 342 is configured to identify the location identifiers 3411; and the identification member 342 is configured to generate reset information in the case that the location identifiers 3411 are identified.

In the embodiment, the detecting assembly can comprise the identifier plate 341 and the identification member 342, and the identifier plate 341 is disposed on the first transmission member 320, and thus, in the case that the first transmission member 320 rotates, the identifier plate 341 can rotate synchronously with the first transmission member 320, the identifier plate 341 is disposed with the location identifier 3411, and correspondingly, the location identifier 3411 can further rotate synchronously with the identifier plate 341; the identification member 342 is configured to identify the location identifier 3411, and generate the reset information of the valve core assembly 200 in the case that the location identifier 3411 is identified; thus, based on the above arrangement, in the use process, when the identification member 342 identifies the location identifier 3411 and generates the location information, it can be determined directly that the valve core assembly 200 is located at the reset position, and this helps conduct the locating and correcting of the valve core assembly 200 in the use process, provides a reference for the control of the operation of the electric motor body, helps further improve the accuracy and convenience of the control over the rotation amount of the valve core assembly 200, and provides a further guarantee to the stable and smooth operation of the valve body device.

It can be understood that the matching between the location identifier 3411 and the working position of the valve core assembly 200 can be conducted when the valve body device is assembled in practical applications, in an embodiment, the location identifier 3411 can be disposed corresponding to one of the plurality of working positions of the valve core assembly 200, i.e., the reset position can be one of the plurality of the working positions, and this helps further improve the convenience for locating the valve core assembly 200.

As shown in FIG. 1 to FIG. 4, in a possible implementation, the location identifiers 3411 are protrusions formed at the peripheral side of the identifier plate 341, and the identification member 342 is a microswitch.

In the embodiment, the location identifier 3411 can be a convex structure disposed on the outer peripheral wall of the identifier plate 341, the identification member 342 can be a microswitch, and thus the location identifier 3411 can trigger the identification member 342 by a touching manner in the process of rotating with the identifier plate 341, and the identification member 342 generates the reset information, and this helps simplify the structure of the position detection assembly 340, reduce the costs in using the position detection assembly 340, and ensure the reliability of the detecting of the position detection assembly 340.

As shown in FIG. 1, in some possible embodiments, the valve body device further can comprise a sealing member portion 500, the sealing member portion 500 is disposed between the valve core assembly 200 and the valve body assembly 100, and is configured to seal the gap between the valve body assembly 100 and the valve core assembly 200, reduce the possibility of the leakage of materials, and helps improve the cleanliness and safety of the valve body device in use.

The second aspect according to the embodiment of the present disclosure provides a beverage machine, comprising: any of the valve body devices provided in the above first aspect.

The beverage machine provided by the embodiments of the present disclosure can comprise any of the valve body devices provided in the above first aspect, and thus can conduct the on-off control of the flow path through the valve body device, and this helps simplify the flow path system of the beverage machine, improve the integration level of the flow path control of the beverage machine, and achieve a further improvement of the levels of the miniaturizing and the lightweight of the beverage machine. Meanwhile, the accuracy of the location switching of the valve core assembly 200 of the valve body device is relatively high, and this helps ensure the stable and reliable operation of the beverage machine.

In a possible implementation, the beverage machine further comprises: a brewing device, and at least one of a plurality of discharge flow paths 102 is communicated to the brewing device; a liquid outlet device, and at least one of the plurality of discharge flow paths 102 is communicated to the liquid outlet device; and a foaming device, and at least one of the plurality of discharge flow paths 102 is communicated to the foaming device.

In the embodiment, the beverage machine can be used as a coffee machine in the practical applications, the brewing device can be configured to brew coffee powder, and thus, when coffee making is needed, the valve core assembly 200 can be rotated to the working position corresponding to the brewing device, to assign hot water for brewing coffee powder to the brewing device; the liquid outlet device can be configured to output liquid, if the beverage machine needs to output the housing externally, the valve core assembly 200 can be rotated to the working position corresponding to the liquid outlet device, to output the liquid through the liquid outlet device; the foaming device can be configured to make milk foam, and thus, when the milk foam is made, the valve core assembly 200 can be rotated to the working position corresponding to the foaming device, to assign the liquid material and/or gas material for making the milk foam to the milk foaming device.

In some possible embodiments, the beverage machine can further comprise a liquid heating device, the liquid heating device can be configured to heat water and can further be configured to output the hot water or steam, the feed flow path 101 of the valve body device can be communicated to the output end of the liquid heating device, and thus, when the coffee machine needs to brew the coffee powder, make the milk foam or directly output the hot water, the hot water or steam can be assigned to the corresponding device through the valve body device.

In addition, the beverage machine provided by the embodiments of the present disclosure comprises any of the valve body devices provided in the above first aspect, and thus has all the beneficial effect of the valve body device, which will not be repeated herein.

As shown in FIG. 5, the third aspect according to the embodiment of the present disclosure provides a beverage machine control method configured to control any of the beverage machines provided in the above second aspect, and the control method comprises:

step S101: in response to a start instruction, controlling the drive assembly 300 to drive the valve core assembly 200 to rotate until the position detection assembly 340 generates reset information.

In an embodiment, in the case of receiving the start instruction, the beverage machine can make a response to the start instruction and control the drive assembly 300 of the valve body device to operate, to drive the valve core assembly 200 of the valve body device to rotate through the drive assembly 300, until the reset detecting assembly of the drive assembly 300 generates the reset information, and thus, the valve core assembly 200 can be located at the reset position, and this helps determine the position state of the valve core assembly 200, achieves determining and correcting the position of the valve core assembly 200, and provide a reference for the following switching of the position of the valve core assembly 200.

It can be understood that the start instruction can be an electrical signal for controlling the start of the beverage machine; in practical applications, the beverage machine can be configured with an instruction receiving assembly, in an embodiment, it can be a button, a key, etc., and the start instruction can be automatically generated after the beverage machine is supplied with power, or can further be given through the instruction receiving assembly, which is not further limited herein.

Step S102: in response to an operating mode instruction, controlling the drive assembly 300 to drive the valve core assembly 200 to rotate to a target working position; and the target working position is one of a plurality of working positions.

In an embodiment, the operating mode instruction can be configured to control the beverage machine to operate in a certain operating mode, in combination with the arrangement of the valve body device, the operating mode instruction can have many types, the working position of each valve core assembly 200 corresponds to one operating mode instruction, and in the case of receiving the operating mode instruction, the beverage machine can make a response to the operating mode instruction and control the drive assembly 300 to operate, to drive the valve core assembly 200 to rotate through the drive assembly 300, and drive the valve core assembly 200 to rotate from the reset position to the target working position, and it can be understood that the target working portion is the working position corresponding to the operating mode instruction, and furthermore, the beverage machine can conduct the corresponding flow path through the valve body device and achieve the rationing of materials and the output of the beverage.

Exemplarily, in the case that the beverage machine comprises the brewing device, the liquid outlet device and the foaming device, the operating mode instruction can further correspondingly comprise a brewing instruction, a liquid outlet instruction and a foaming instruction, and in the case that the operating mode instruction is the brewing instruction, the valve core assembly 200 can be controlled to rotate to the working position corresponding to the brewing device, and the materials can flow to the brewing device through the valve body device; in the case that the operating mode instruction is the liquid outlet instruction, the valve core assembly 200 can be controlled to rotate to the working position corresponding to the liquid outlet device, and the materials can flow to the liquid outlet device through the valve body device; in the case that the operating mode instruction is the foaming instruction, the valve core assembly 200 can be controlled to rotate to the working position corresponding to the foaming device, and the materials can flow to the foaming device through the valve body device.

To sum up, according to the beverage machine control method proposed by the embodiments of the present disclosure, when the beverage machine starts, the valve core assembly 200 of the valve body device can be rotated to the reset position, and the control over the rotating of the valve core assembly 200 can be conducted by taking the reset position as a standard, i.e., in the process of using the drive assembly 300 to drive the valve core assembly 200 to rotate from the current position to the target working position, the valve core assembly 200 can be rotated from the current position to the reset position, and from the reset position to the target working position, and this prevents the lowering of the accuracy of the control over the rotating of the valve core assembly 200 caused by error accumulation, provides a guarantee for the valve body device to stably and accurately conduct flow path control, and ensures the stable and smooth operation of the beverage making device in the case that the valve body device is applied to the beverage making device.

In a possible implementation, the step of controlling the drive assembly 300 to drive the valve core assembly 200 to rotate to a target working position in response to an operating mode instruction comprises:

determining the target working position according to the operating mode instruction;
controlling the drive assembly 300 to operate to drive the valve core assembly 200 to rotate;

controlling the detection assembly 400 to operate to determine the rotating angle of the valve core assembly 200; and
controlling the drive assembly 300 to stop in the case that the rotating angle reaches a target rotating angle;
the target rotating angle is equal to the included angle between a reset position and the target working position along a rotating direction.

In an embodiment, in the process of controlling the drive assembly 300 to drive the valve core assembly 200 to rotate to the target working position in response to the operating mode instruction, the target working position can be determined based on the operating mode instruction, to determine the needed target rotating angle of the valve core assembly 200 which rotates from the reset position to the target working position according to the target working position, and in the process that the drive assembly 300 drives the valve core assembly 200 to rotate, the detection assembly 400 can be controlled to determine the rotating angle of the valve core assembly 200, to get to know the actually executed rotating angle of the valve core assembly 200, and furthermore, in the case that the rotating angle reaches the target rotating angle, the drive assembly 300 can be controlled to stop, the valve core assembly 200 stops at the target working position, to execute the material rationing operation corresponding to the working position; thus, based on detecting the actual rotating angle of the valve core assembly 200 by the detection assembly 400, it helps timely master the position circumstances in the rotating process of the valve core assembly 200, helps achieve the accurate control over the rotating of the valve core assembly 200, and further provides a guarantee to the stable and smooth operations of the valve body device and the beverage machine.

As shown in FIG. 6, the fourth aspect according to the embodiments of the present disclosure provides a computer readable storage medium 601, and the computer readable storage medium 601 stores computer programs 602 to achieve any of the control methods provided in the above third aspect.

Since the computer readable storage medium 601 provided in the embodiments of the present disclosure is configured to achieve any of the control methods provided in the above third aspect, it has all the beneficial effect of the control method, and is not repeated herein.

Figure 7:
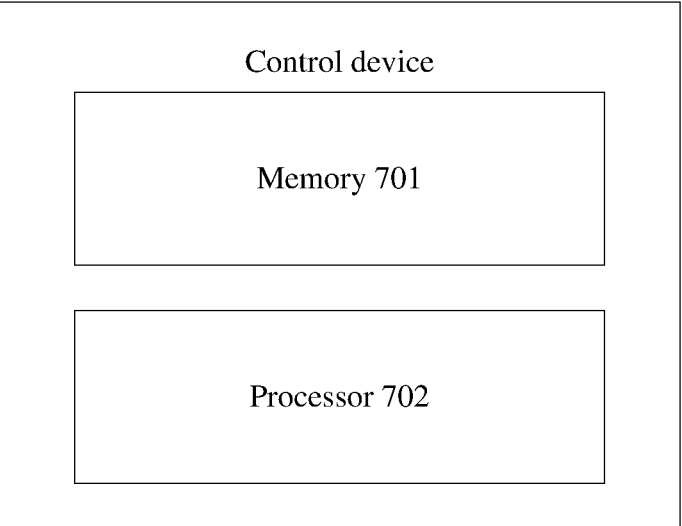
FIG. 7 shows a schematic block diagram of the structure of a control device according to an embodiment of the present disclosure.

As shown in FIG. 7, the fifth aspect according to the embodiments of the present disclosure provides a control device, comprising: a memory 701, stored with computer programs; and a processor 702, executing the computer programs; and any of the control methods provided in the above third aspect is achieved when the processor 702 executes the computer programs.

Since the control device provided in the embodiments of the present disclosure is configured to achieve any of the control methods provided in the above third aspect, it has all the beneficial effect of the control method, and is not repeated herein.

In the present disclosure, the terms of "first," "second" and "third" are used only for the purpose of description and shall not be understood to indicate or imply any relative importance; the term of "a plurality of" indicates two or more, unless otherwise explicitly specified or defined. The terms of "assembling," "connected with," "connected to," "fixing" and the like should be understood in a broad sense, for example, the term "connected to" may be a fixed connection, and may further be a removable connection, or an integral connection; and the term of "connected to" may be a direct connection and may further be an indirect connection through an intermediate medium. A person of ordinary skills in the art could understand the specific meanings of the terms in the present disclosure according to specific situations.

In the description of the present disclosure, it needs to be understood that the orientation or position relations indicated by the terms of "upper," "lower," "left," "right," "front," "rear" and the like are based on the orientation or position relations shown in the accompanying drawings, and they are just intended to conveniently describe the present disclosure and simplify the description, and are not intended to indicate or imply that the devices or units as indicated should have specific orientations or should be configured or operated in specific orientations, and then should not be construed as limitations to the present disclosure.

In the description of the present specification, the descriptions of the phrases "one embodiment," "some embodiments" and "specific embodiments" and the like mean that the specific features, structures, materials or characteristics described in combination with the embodiment(s) or embodiment(s) are included in at least one embodiment or embodiment of the present disclosure. In the specification, the schematic representation of the above phrases does not necessarily refer to the same embodiment or embodiment. Moreover, the particular features, structures, materials or characteristics described may be combined in a suitable manner in any one or more of the embodiments or embodiments.

The descriptions above are only some embodiments of the present disclosure, and are not configured to limit the present disclosure. For a person skilled in the art, the present disclosure may have various changes and variations. Any modifications, equivalent substitutions, improvements, etc. made within the spirit and principle of the present disclosure shall all be included in the protection scope of the present disclosure.

What is claimed is:

1. A valve body device, comprising:
a valve body assembly including a feed flow path and a plurality of discharge flow paths;
a valve core assembly rotatably provided at the valve body assembly and having a reset position and a plurality of working positions along a rotating direction, the plurality of working positions corresponding to the plurality of discharge flow paths, respectively, and when the valve core assembly is at one working position of the plurality of working positions, one of the plurality of discharge flow paths corresponding to the one working position communicating with the feed flow path;
a drive assembly configured to drive the valve core assembly to rotate, the drive assembly including:
a position detection assembly configured to generate reset information in response to the valve core assembly being at the reset position;
a drive member;
a first transmission member connected to the valve core assembly; and
a plurality of second transmission members connected successively and between the drive member and the first transmission member; and
a detection assembly configured to detect rotation information of the drive assembly, and determine a rotating angle of the valve core assembly based on the rotation information, the detection assembly including a trigger member and a detection member arranged apart from each other, and the trigger member and the detection member being respectively provided at two adjacent ones of the plurality of second transmission members.

2. The valve body device according to claim 1, wherein:
the detection assembly is configured to detect rotation information of the drive member or rotation information of the second transmission member.

3. The valve body device according to claim 1, wherein:
the detection member is configured to detect a rotation amount of the trigger member with respect to the detection member, to determine the rotation information of the drive assembly based on the rotation amount.

4. The valve body device according to claim 1, wherein:
the detection assembly further includes a support member.

5. The valve body device according to claim 1, wherein:
an output shaft of the drive member includes a drive end and a free end, and the drive end is connected to the second transmission member.

6. The valve body device according to claim 1, wherein:
the trigger member includes a magnetic member, and the detection member includes a magnetic angle sensor;
the trigger member includes a capacitance electrode, and the detection member includes a capacitance sensor; or
the detection member includes a radar.

7. The valve body device according to claim 6, wherein:
the magnetic angle sensor includes a hall sensor.

8. A valve body device, comprising:
a valve body assembly including a feed flow path and a plurality of discharge flow paths;
a valve core assembly rotatably provided at the valve body assembly and having a reset position and a plurality of working positions along a rotating direction, the plurality of working positions corresponding to the plurality of discharge flow paths, respectively, and when the valve core assembly is at one working position of the plurality of working positions, one of the plurality of discharge flow paths corresponding to the one working position communicating with the feed flow path;
a drive assembly configured to drive the valve core assembly to rotate, the drive assembly including:
a position detection assembly configured to generate reset information in response to the valve core assembly being at the reset position;
a drive member;
a first transmission member connected to the valve core assembly; and
a plurality of second transmission members connected successively and between the drive member and the first transmission member; and
a detection assembly configured to detect rotation information of the drive assembly, and determine a rotating angle of the valve core assembly based on the rotation information, the detection assembly including a trigger member and a detection member arranged apart from each other, and the trigger member and the detection member being respectively provided at two adjacent ones of the plurality of second transmission members, the detection assembly being configured to detect rotation information of the drive member or rotation information of the second transmission member, and detect a rotation amount of the trigger member with respect to the detection member, to determine the rotation information of the drive assembly based on the rotation amount.

* * * * *